(12) United States Patent
Kosaka (10) Patent No.: US 12,355,311 B2
(45) Date of Patent: Jul. 8, 2025

(54) STATIC CHARGE ELIMINATION METHOD AND STATIC CHARGE ELIMINATOR

(71) Applicant: DENSO CORPORATION, Kariya (JP)

(72) Inventor: Yuki Kosaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 237 days.

(21) Appl. No.: 18/201,324

(22) Filed: May 24, 2023

(65) Prior Publication Data
US 2023/0387759 A1  Nov. 30, 2023

(30) Foreign Application Priority Data
May 25, 2022 (JP) .............................. 2022-085296

(51) Int. Cl.
| | |
|---|---|
| H02K 11/028 | (2016.01) |
| G01M 3/40 | (2006.01) |
| H02K 1/14 | (2006.01) |
| H02K 3/12 | (2006.01) |
| H02K 11/40 | (2016.01) |

(52) U.S. Cl.
CPC ........... *H02K 11/028* (2013.01); *H02K 1/145* (2013.01); *H02K 3/12* (2013.01)

(58) Field of Classification Search
CPC ...... H02K 11/028; H02K 11/00; H02K 11/01; H02K 11/40; H02K 2215/00; H02K 99/00; H02K 99/10; H02K 99/20
USPC .................... 310/51, 66, 67 R; 361/220, 212
See application file for complete search history.

(56) References Cited

U.S. PATENT DOCUMENTS

| | | | | |
|---|---|---|---|---|
| 5,821,652 | A | * | 10/1998 | Hyypio .............. H02K 11/0141 310/83 |
| 7,136,271 | B2 | * | 11/2006 | Oh ............................ H05F 3/04 361/220 |

FOREIGN PATENT DOCUMENTS

| | | |
|---|---|---|
| JP | 2005-257549 A | 9/2005 |
| JP | 2016-070859 A | 5/2016 |

* cited by examiner

*Primary Examiner* — Burton S Mullins
(74) *Attorney, Agent, or Firm* — Oliff PLC

(57) ABSTRACT

A static charge eliminator for neutralizing static electricity on an armature, such as a rotor or a stator of a rotating electrical machine. The static charge eliminator includes a first contact, a second contact, a third contact, and a drive unit. The drive unit works to move at least one of the first, second, and third contact and the armature to simultaneously achieve electrical contacts between the first contact and a core of the armature, between the second contact and a metallic section(s) of wire segments of a coil of the armature or power wires electrically connecting with the coil, and between the third contact and outer layers of portions of the wire segments contacting a coil end protruding outside an axial end of the core of the armature. A static charge elimination method is also provided.

12 Claims, 6 Drawing Sheets

STATIC CHARGE ELIMINATION METHOD AND STATIC CHARGE ELIMINATOR

CROSS REFERENCE TO RELATED DOCUMENT

The present application claims the benefit of priority of Japanese Patent Application No. 2022-085296 filed on May 25, 2022, the disclosure of which is incorporated in its entirety herein by reference.

BACKGROUND

1 Technical Field

This disclosure relates generally to a static charge elimination method of neutralizing static electricity on an armature (e.g., a stator or a rotor) of a rotating electrical machine and a static charge eliminator capable of neutralizing static electricity on the armature.

2 Background Art

A typical production process for fabricating an armature of a rotating electrical machine usually includes conducting an insulation inspection of outer layers of wires of a three-phase coil of the armature or resin-molded covers wrapping portions of the wires. Japanese Patent First Publication No. 2016-70859 teaches an insulation inspection conducted to determine whether there is an insulation fault resulting from conductor-exposure caused by a pin hole(s) in outer layers of portions of wires constituting a coil end of a three-phase coil or resin-molded covers wrapping the portions of the wires. Specifically, the insulation inspection of the outer layers of the portions of the wires constituting the coil end is achieved by connecting an electrode together and a first probe of an insulation inspection device, connecting a second probe of the insulation inspection device and metallic sections of the wires together, applying voltage to the electrode to create a potential difference between the electrode and the metallic sections of the wires for generate space discharge or surface discharge, and measuring a change in such potential difference. When the change in potential difference is smaller than a given threshold value, it is determined that the armature is an acceptable product. Alternatively, when the change in potential difference is larger than the given threshold value, it is determined that an insulation fault is determined to have occurred in the armature. The space discharge or the surface discharge, as referred to therein, is an electrical discharge generated in a location of an insulation fault, such as a pin hole through which an electrical conductor is exposed, which occurs, for example, in the outer layers of the wires of the coil end. The insulation inspection conducted in the production process of the armature may, however, cause the armature to be electrically charged by the voltage applied thereto to check the insulation fault, thereby leading to a risk that when a worker directly touches the armature immediately after the insulation inspection, it may discharge an electrical current between the armature and the worker, so that the worker may be subjected to an electrical shock. However, when a long time interval is allowed after the insulation inspection in order to ensure physical safety for the worker, it may result in reduction in productivity of the armature.

Static charge elimination methods are known which use an ionizer. Experimental tests conducted by the inventor of this application show that it is impossible to neutralize static electricity on a complicated structure of an assembly, such as an armature, which includes electrical conductors, such as metallic wires or a core of a coil, and insulators, such as an outer layer, of the coil.

It is, therefore, an object of this disclosure to provide a static charge elimination method and a static charge eliminator which are capable of neutralizing static electricity on an armature.

SUMMARY

According to one aspect of this disclosure, there is provided a static charge elimination method for neutralizing static electricity on an armature of a rotating electrical machine. The static charge elimination method comprises: (a) a first step of placing a first contact in contact with a core of the armature, the first contact being connected to ground; (b) a second step of placing a second contact in contact with a metallic section of one of wire segments constituting a coil of the armature or a metallic section of one of power wires electrically connecting with the coil, the second contact being connected to ground; and (c) a third step of placing a third contact in contact with at least one of outer layers of portions of the wire segments constituting a first coil end protruding from slots formed in the core outside a first end that is one of axially opposed ends of the core, the third contact being connected to ground. The first step, the second step, and the third step are performed simultaneously.

The static charge elimination method serves to avoid dielectric polarization of the outer layers of the wire segments and eliminate static charge on the armature, which improves the productivity and safety of the armature.

The simultaneous contacts between the core and the first contact, between the metallic section of the wire segment or the power line and the second contact, and between the outer layers of the wire segments and the third contact, as referred to in this disclosure, mean the fact that periods of time for which the above three contacts are established may at least partially overlap each other without the need for coincidence of start times or end times of the contacts.

According to the second aspect of this disclosure, there is provided a static charge elimination method for neutralizing static electricity on an armature of a rotating electrical machine. The static charge elimination method comprises: (a) a first step of placing a first contact in contact with a core of the armature, the first contact being connected to ground; (b) a second step of placing a second contact in contact with a metallic section of one of power wires electrically connecting with the coil, the second contact being connected to ground; (c) a third step of placing a third contact in contact with at least one of outer layers of portions of the wire segments constituting a first coil end protruding from slots formed in the core outside a first end that is one of axially opposed ends of the core, the third contact being connected to ground; and (d) a fourth step of placing a fourth contact in contact with a resin-molded member wrapping the wire segments constituting a second coil end protruding from slots formed in the core outside a second end of the core axially opposed to the first end of the core, the fourth contact being connected to ground. The first step, the second step, the third step, and the fourth step are performed simultaneously.

The static charge elimination method serves to eliminate a risk of dielectric polarization of the outer layers of the wire segments and remove static charge from the armature, thereby improving the productivity and safety of the armature.

The simultaneous contacts between the core and the first contact, between the metallic section of the wire segment or the power line and the second contact, between the outer layers of the wire segments and the third contact, and between the resin-molded member and the fourth contact, as referred to in this disclosure, mean the fact that periods of time for which the above four contacts are established may at least partially overlap each other without the need for coincidence of start times or end times of the events of the contacts.

According to the third aspect of this disclosure, there is provided a static charge eliminator for neutralizing static electricity on an armature of a rotating electrical machine. The static charge eliminator comprises: (a) a first contact which is contactable with a core of the armature and connected to ground; (b) a second contact which is contactable with a metallic section of one of wire segments constituting a coil of the armature or a metallic section of one of power wires electrically connecting with the coil, the second contact being connected to ground; (c) a third contact which is contactable with at least one of outer layers of portions of the wire segments constituting a first coil end protruding from slots formed in the core outside a first end that is one of axially opposed ends of the core, the third contact being connected to ground; and (d) a drive unit which works to move at least one of the first contact, the second contact, the third contact, and the armature to simultaneously achieve contacts between the core and the first contact, between the metallic section of one of the wire segments or the metallic section of one of the power wires and the second contact, and between the outer layers of the portions of the wire segments and the third contact.

The static charge eliminator serves to eliminate a risk of dielectric polarization of the outer layers of the wire segments and remove static charge from the armature.

According to the fourth aspect of this disclosure, there is provided a static charge eliminator for neutralizing static electricity on an armature of a rotating electrical machine. The static charge eliminator comprises: (a) a first contact which is contactable with a core of the armature and connected to ground; (b) a second contact which is contactable with a metallic section of one of power wires electrically connecting with the coil, the second contact being connected to ground; (c) a third contact which is contactable with at least one of outer layers of portions of the wire segments constituting a first coil end protruding from slots formed in the core outside a first end that is one of axially opposed ends of the core, the third contact being connected to ground; (d) a fourth contact which is contactable with a resin-molded member wrapping the wire segments constituting a second coil end protruding from slots formed in the core outside a second end of the core axially opposed to the first end of the core, the fourth contact being connected to ground; and (e) a drive unit which works to move at least one of the first contact, the second contact, the third contact, the fourth contact, and the armature to simultaneously achieve contacts between the core and the first contact, between the metallic section of one of the power wires and the second contact, between the outer layers of the portions of the wire segments and the third contact, and between the resin-molded member and the fourth contact.

The static charge eliminator serves to eliminate a risk of dielectric polarization of the resin-molded member wrapping the power wire and the outer layers of the wires and remove static charge from the armature.

Symbols in brackets attached to component parts, as discussed below, are used only to indicate exemplified correspondences between the symbols and the component parts.

BRIEF DESCRIPTION OF THE DRAWINGS

The present disclosure will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

An embodiment will be described below with reference to the drawings. In the following discussion, like reference numbers refer to like parts in several views, and explanation thereof in detail will be omitted here.

First Embodiment

The first embodiment will be described below with reference to the drawings. A static charge elimination method and a static charge eliminator according to the first embodiment, as illustrated in FIG. 1, works to eliminate or neutralize static electricity charged on the stator 1 used, for example, as an armature of a rotating electrical machine, such as a motor-generator mounted in an electrical vehicle.

Figure 1:
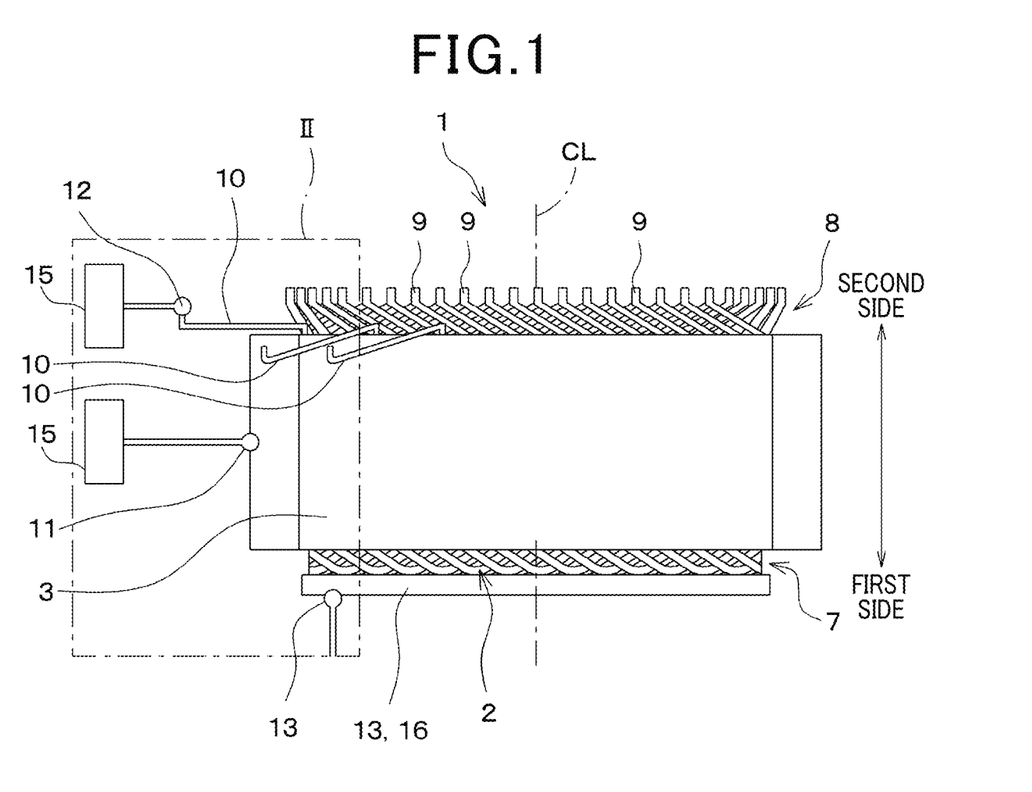
FIG. 1 is a side view which illustrates an armature and a static charge eliminator according to the first embodiment.
Figure 2:
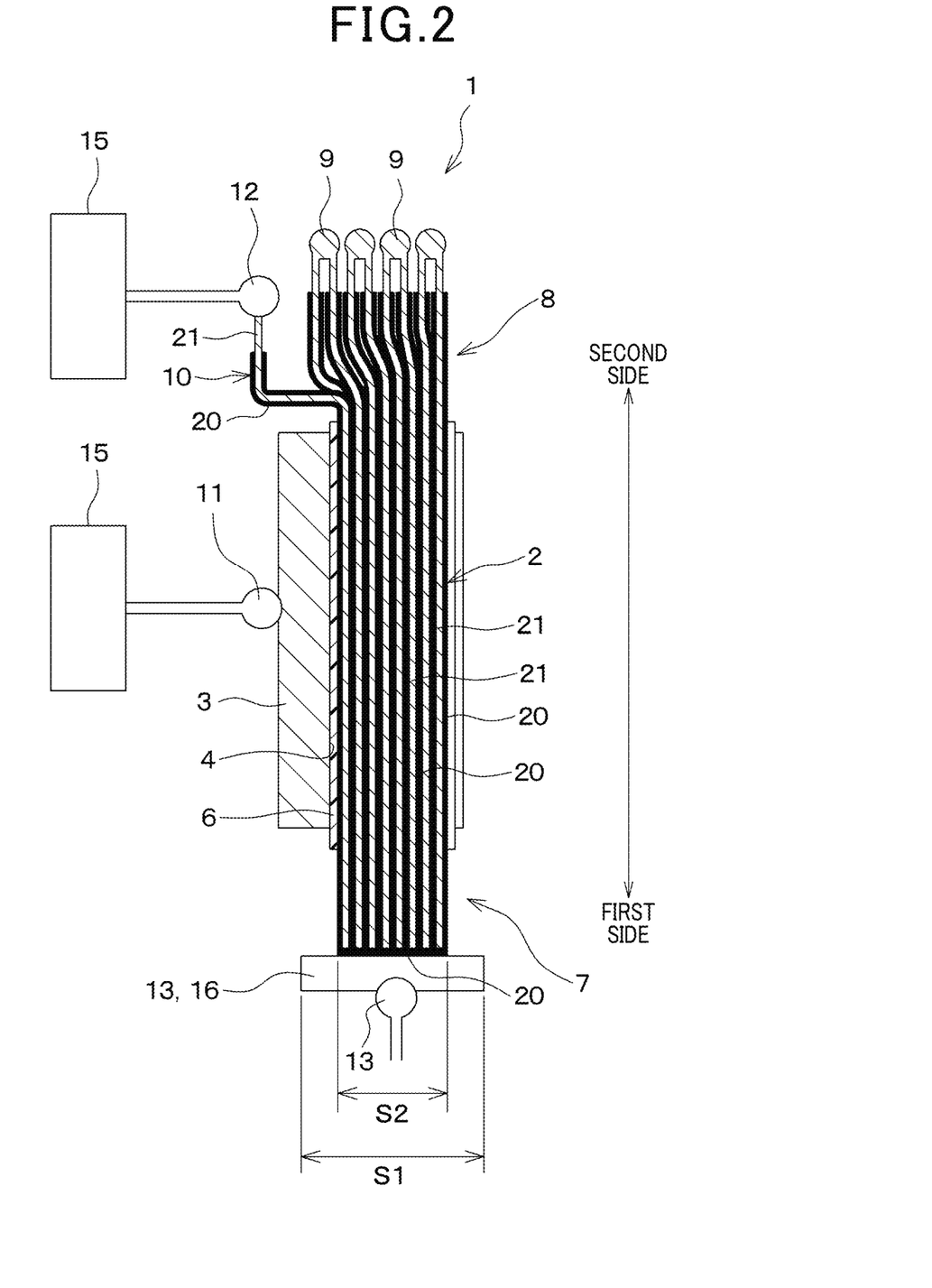
FIG. 2 is a longitudinal sectional view which illustrates a portion of a stator, as enclosed by a broken line II.

The stator 1, as can be seen in FIGS. 1 and 2, includes the annular core (also called a stator core) 3, the coil 2 made of a conductor extending through the slots 4 formed in the core 3, and the insulating sheets 6 each disposed between an inner wall of a respective one of the slots 4 and the conductor of the coil 2. The coil 2, as referred to herein, is designed in the form of a three-phase coil constituting a portion of a three-phase A.C. circuit.

The coil 2 includes a U-phase winding, a V-phase winding, and a W-phase winding each of which is made of U-shaped wire segments each of which is formed by the metallic portion 21 wrapped by the outer layer 20 serving as an electrical insulator made from enamel. The production of the stator 1 is achieved by inserting the U-shaped wire segments into the slots 4 from a first one (also referred to as a first side or a first axial side) of axially opposed ends of the core 3 to a second end (also referred to as a second side or a second axial side) of the core 3, so that portions of the wire segments which protrude outside the first end of the core 3 (which will also be referred to as the first coil end 7) are covered with the outer layers 20. An axial direction, as referred to herein, is a direction in which the center axis CL of the core 3 extends.

The wire segments of the coil 2 also have portions which protrude outside the second end of the core 3 (which will also be referred to as the second coil end 8) and a respective two of which are welded together. In the following discussion, the welded portions of the wire segments of the coil 2 which are exposed outside the outer layers 20 will also be referred to as welds 9. The U-phase winding, the V-phase winding, and the W-phase winding of the coil 2 have the power wires 10 electrically connected thereto. The power wires 10 extend from the second coil end 8 (i.e., the second side) of the coil 2 outside the core 3 in the radial direction.

In the production process of the stator 1, an insulation inspection is conducted to inspect degrees of electrical insulation of the outer layers 20 of the wire segments which constitute the first coil end 7 of the coil 2 and protrude from the slots 4 in the core 3 outside the first end of the core 3. The insulation inspection is achieved by applying a voltage to the stator 1 to create an electrical potential difference between an electrode and each of the metallic sections 21 of the wire segments of the coil 2 or each of the metallic sections 21 of the power wires 10 to develop a spatial discharge or a creeping discharge and measuring a change in the electrical potential difference. The space discharge or the surface discharge, as referred to therein, is an electrical discharge generated in a location of an insulation fault, such as a pin hole through which an electrical conductor is exposed, which occurs in the outer layers 20. When the measured changes in electrical potential differences are lower than a given threshold level, the stator 1 is determined to be an acceptable product. Alternatively, when one of the measured changes in electrical potential differences is higher than the given threshold value, an insulation fault is determined to have occurred in the layer 20.

The insulation inspection conducted in the production process of the stator 1 has a risk that the stator 1 may be electrically charged due to the application of voltage thereto in the insulation inspection. In order to alleviate such a drawback, the static charge eliminator or the static charge elimination method in this embodiment is designed to remove the static charge from the stator 1 electrically charged in the insulation inspection.

The static charge eliminator in the first embodiment is equipped with the first contact 11, the second contact 12, the third contact 13, and the drive unit 15.

The first contact 11, the second contact 12, and the third contact 13 are each made from an electrically conductive material. The first contact 11, the second contact 12, and the third contact 13 are connected to ground through ground wires, not shown.

The first contact 11 is arranged to be contactable with the core 3 of the stator 1. The core 3 is made of a stack of metallic steel plates. The first contact 11 is capable of neutralizing static electricity charged on the core 3.

The second contact 12 is arranged to be contactable with the metallic section 21 of one of the power wires 10 of the stator 1. The second contact 12 is capable of removing static electricity from the metallic sections 21 of all of the wire segments of the coil 2 of the stator 1. The second contact 12, although not illustrated, may alternatively be designed to be contactable with one of the welds 9 of the ends of the wire segments of the coil 2. In other words, the second contact 12 may be configured to be electrically contactable with the metallic section 21 of a selected one of the wire segments of the coil 2 or the metallic section 21 of a selected one of the power wires 10 of the stator 1.

The third contact 13 is arranged to be contactable with the outer layers 20 of the wire segments defining the first coil end 7. Specifically, the third contact 13 includes the plate 16 of an annular or a disc-shape. The plate 16 is made from an electrically conductive material and has an area 51, as viewed in the axial direction of the core 3, which is substantially identical with or larger than an area S2 that is an area of a region which is defined to extend in a direction perpendicular to the axial direction of the core 3 and occupied by the outer layers 20 of the wire segments of the first coil end 7. In other words, the whole of the region where the outer layers 20 of the wire segments of the first coil end 7 are arranged overlaps entirely with the major surface of the plate 16 of the third contact 13, as viewed in the axial direction of the core 3, so that the plate 16 is contactable with the outer layers 20 of all of the wire segments constituting the first coil end 7. This enables the third contact 13 to avoid dielectric polarization of the outer layers 20 of the wire segments of the first coil end and neutralize static electricity charged on the outer layers 20. The third contact 13 may alternatively be configured not to be contactable with the outer layers 20 of one or some of the wire segments in view of a production error of the coil 2.

The drive unit 15 is actuated to move at least one of the first contact 11, the second contact 12, the third contact 13, and the stator 1 to achieve an electrical contact of each of the first contact 11, the second contact 12, the third contact 13 with a given portion of the stator 1. Specifically, the drive unit 15 works to move at least one of the first contact 11, the second contact 12, the third contact 13, and the stator 1 to simultaneously make contact of the core 3 with the first contact 11, contact of one of the metallic sections 21 of the power wires 10 or one of the wire segments of the coil 2 with the second contact 12, and contact of at least one of the outer layers 20 of the wire segments with the third contact 13.

In the example illustrated in FIGS. 1 and 2, the drive unit 15 is designed to operate the first contact 11 and the second contact 12. Specifically, the stator 1 is disposed on the plate 16 of the third contact 13 with the outer layers 20 of the wire segments of the first coil end 7 being in contact with the plate 16 of the third contact 13. The drive unit 15 then moves both the first contact 11 and the second contact 12 to simultaneously make a physical contact of the first contact 11 with the core 3, a physical contact of the second contact 12 with the metallic section 21 of the power wire 10 or the metallic section 21 of the wire segment of the coil 2, and a physical contact of the third contact 13 with the outer layers of the wire segments of the coil 2, thereby neutralizing static electricity charged on portions of the stator 1 without a risk that the static electricity may escape to other portions of the stator 1.

Verification Tests

Tests to verify the neutralization of static electricity achieved by the static charge eliminator in the first embodiment will be described below with reference to FIGS. 3 to 5.

Figure 3:
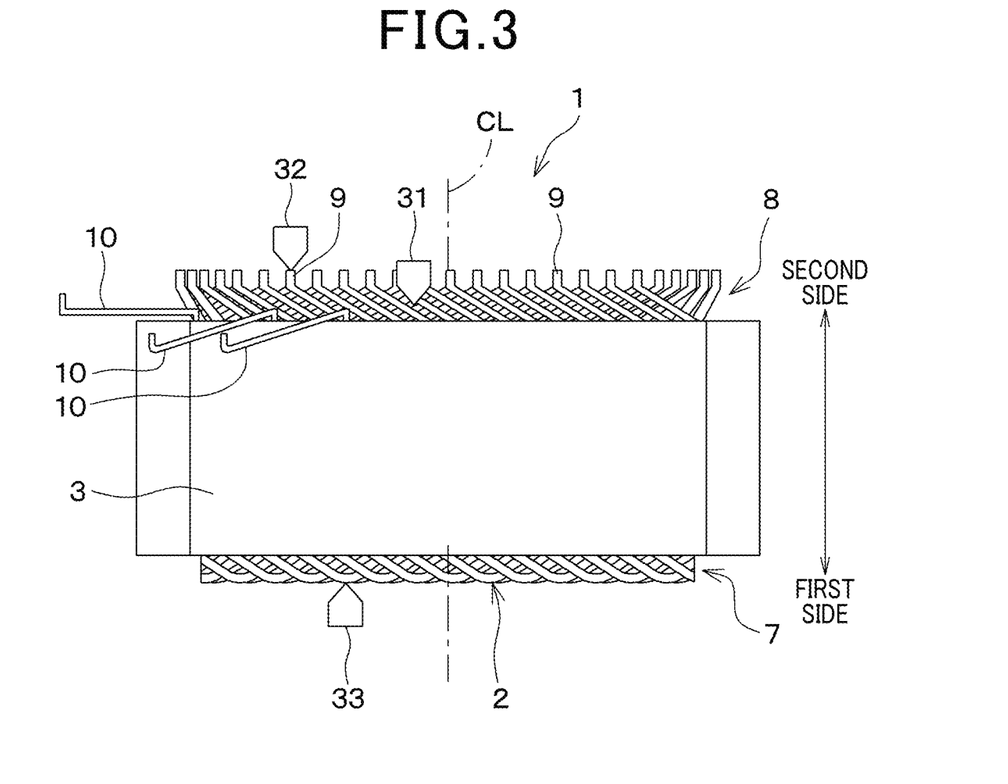
FIG. 3 is a view which illustrates locations of sensors used in verification tests for neutralization of static electricity using a static charge eliminator in the first embodiment.

We conducted verification tests using the sensors 31, 32, and 33 which are, as illustrated in FIG. 3, attached to portions of the stator 1 to measure levels of voltage charged thereon. Specifically, the first sensor 31 was arranged at an intersection of the outer layers 20 of the wire segments defining the second coil end 8 of the coil 2. The second sensor 32 was arranged on the weld 9 of the ends of the wire segments constituting the second coil end 8 of the coil 2. The third sensor 33 was disposed on the outer layers 20 of the wire segments constituting the first coil end 7 of the coil 2. The voltage was applied to the stator 1 to charge it in the same way as in the insulation inspection. Afterwards, the static electricity on the stator 1 was neutralized by the static charge eliminator.

Figure 4:
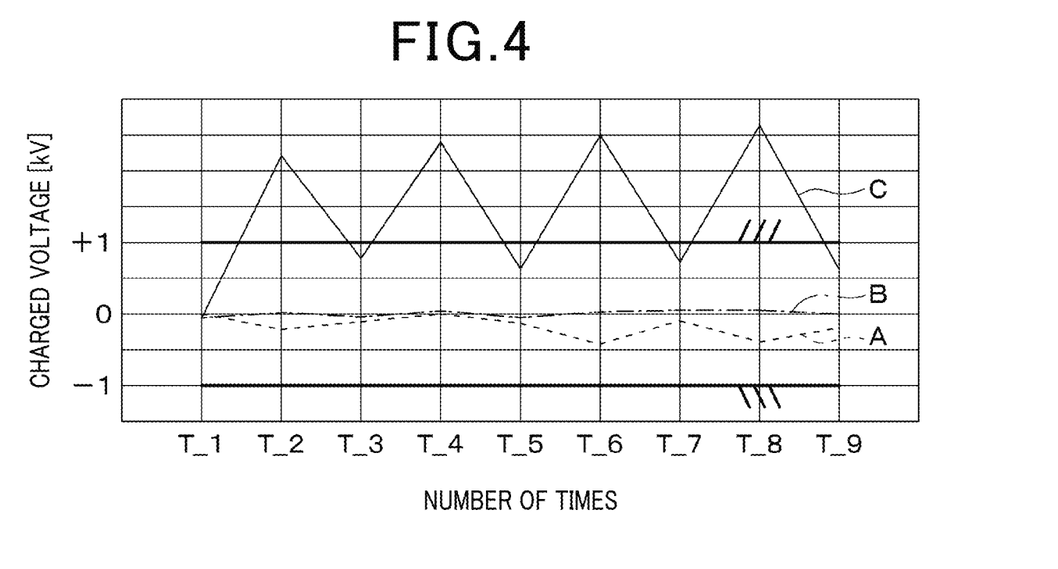
FIG. 4 is a graph which represents results of verification tests for neutralization of static electricity in a first condition using a static charge eliminator in the first embodiment.

FIG. 4 is a graph which shows a change in level of voltage which was charged on the stator 1 and then neutralized by the static charge eliminator. Specifically, after the outer layers 20 of the wire segments constituting the first coil end 7 were positively charged, the static electricity was neutralized by the static charge eliminator. Such charging and neutralization were conducted cyclically.

The horizontal axis in FIG. 4 indicates the number of times the outer layers 20 are charged or neutralized. The vertical axis in FIG. 4 indicates the charged voltage. The broken line A represents the level of charged voltage measured by the first sensor 31. The chain line B represents the level of charged voltage measured by the second sensor 32. The solid line C represents the level of charged voltage measured by the third sensor 33. The same is true for FIGS. 5 to 9, as will be discussed later, except for the horizontal axis.

$T\_2$, $T\_4$, $T\_6$, and $T\_8$ in FIG. 4 denote the levels of charged voltage after the stator 1 is charged. $T\_3$, $T\_5$, $T\_7$, and $T\_9$ denote the levels of charged voltage after the static electricity on the stator 1 is neutralized. The graph shows that after the static electricity is removed by the static charge eliminator in the first embodiment, the levels of charged voltage measured by the first to third sensors 31 to 33 all lie in a range of, for example, 1 kV to −1 kV where most people will be unaware of electrical shocks.

Figure 5:
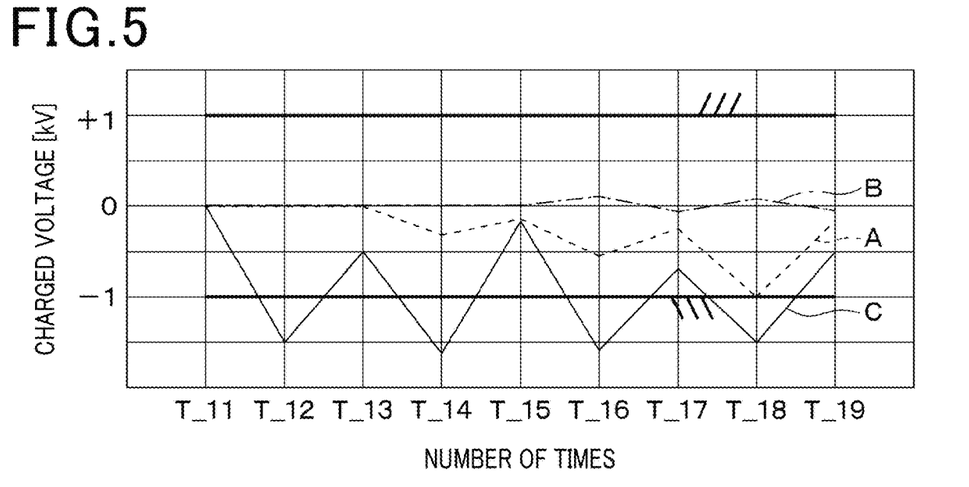
FIG. 5 is a graph which represents results of verification tests for neutralization of static electricity in a second condition using a static charge eliminator in the first embodiment.

FIG. 5 is a graph which shows a change in level of voltage which was charged on the stator 1 and then neutralized by the static charge eliminator. Specifically, after the outer layers 20 of the wire segments defining the first coil end 7 were negatively charged, the static electricity was neutralized by the static charge eliminator. Such charging and neutralization were conducted cyclically. $T\_12$, $T\_14$, $T\_16$, and $T\_18$ in FIG. 5 denote the levels of charged voltage after the stator 1 is charged. $T\_13$, $T\_15$, $T\_17$, and $T\_19$ denote the levels of charged voltage after the static electricity on the stator 1 is neutralized. The graph shows that after the static electricity is removed by the static charge eliminator in the first embodiment, the levels of charged voltage measured by the first to third sensors 31 to 33 all lie in a range of, for example, 1 kV to −1 kV where most people will be unaware of electrical shocks.

Comparative Example

Verification tests performed using an ionizer will be described as compared to the static charge eliminator in the first embodiment with reference to FIGS. 6 to 9.

Figure 6:
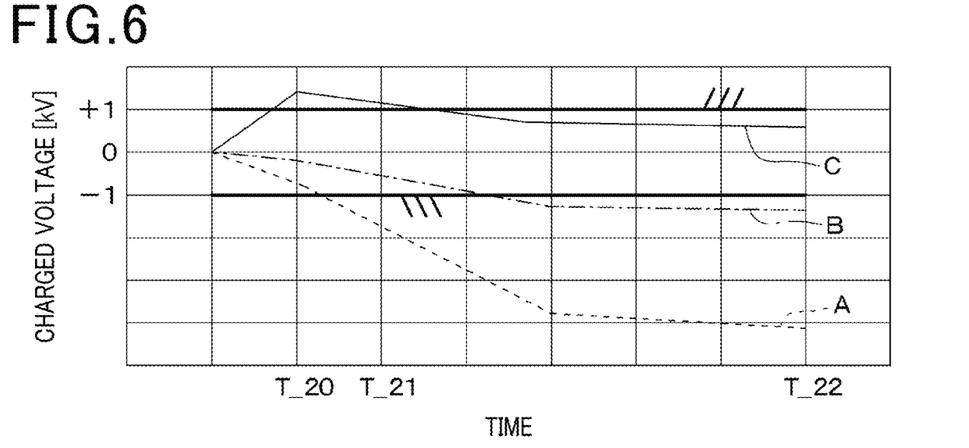
FIG. 6 is a graph which represents results of verification tests for neutralization of static electricity using a typical ionizer in a first comparative example.

FIG. 6 shows a change in level of voltage which is charged on the stator 1 and then neutralized by the ionizer. Specifically, after the outer layers 20 of the wire segments constituting the first coil end 7 are charged over +1 kV, the first coil end 7 is exposed to negative ions emitted by the ionizer.

The horizontal axis in FIG. 6 indicates the time. The same is true for FIGS. 7 to 9 which will be referred to later. $T\_20$ in FIG. 6 denotes levels of voltage at the stator 1 after the stator 1 is charged. $T\_21$ to $T\_22$ denote levels of voltage at the stator 1 after the static electricity on the stator 1 is neutralized. The broken line A shows that the level of voltage charged on the stator 1 which is measured by the first sensor 31 after the static electricity on the stator 1 is neutralized by the ionizer, i.e., the level of voltage charged on the outer layers 20 of the second coil end 8 increases to be higher than −1 kV in terms of an absolute value with the passage of time, so that it will lie in a voltage range where most people will be unaware of electrical shocks.

Figure 7:
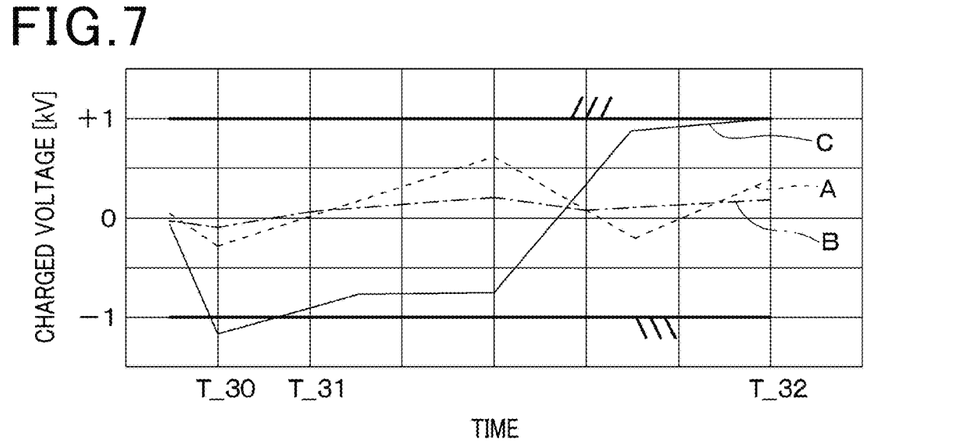
FIG. 7 is a graph which represents results of verification tests for neutralization of static electricity using a typical ionizer in a second comparative example.
Figure 8:
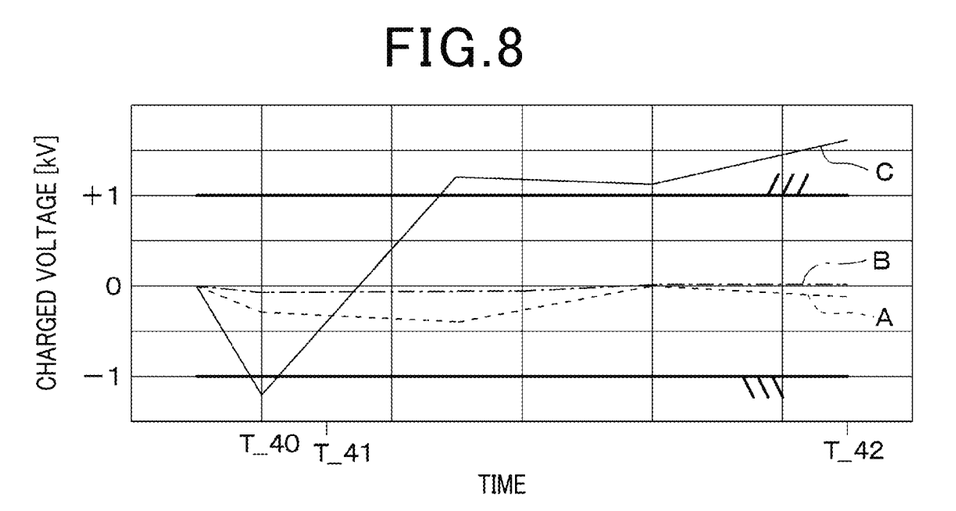
FIG. 8 is a graph which represents results of verification tests for neutralization of static electricity using a typical ionizer in a third comparative example.

FIG. 7 shows a change in level of voltage charged on the stator 1 when the outer layers 20 of the wire segments constituting the first coil end 7 are charged to a voltage level greatly higher than −1 kv in terms of an absolute value, after which the first coil end 7 and the second coil end 8 are both exposed to positive and negative ions emitted from the ionizer. In FIG. 7, $T\_30$ denotes levels of voltage on the stator 1 after the stator 1 is charged. $T\_31$ to $T\_32$ denote levels of voltage on the stator 1 after static electricity on the stator 1 is neutralized. The solid line C shows that after the stator 1 is neutralized by the ionizer, the level of voltage, as measured by the third sensor 33, i.e., on the outer layers 20 of the first coil end 7 becomes +1 kV with the passage of time which lies in a range where most people will be unaware of electrical shocks. FIG. 8 shows a change in level of voltage charged on the stator 1 when the outer layers 20 of the wire segments constituting the first coil end 7 are charged to a voltage level greatly higher than −1 kv in terms of an absolute value, after which the first coil end 7 is exposed to positive ions emitted from the ionizer, while the second coil end 8 is exposed to positive and negative ions emitted from the ionizer. In FIG. 8, $T\_40$ denotes levels of voltage on the stator 1 after the stator 1 is charged. $T\_41$ to $T\_42$ denote levels of voltage charged on the stator 1 after static electricity on the stator 1 is neutralized. The solid line C shows that after the stator 1 is neutralized by the ionizer, the level of voltage, as measured by the third sensor 33, i.e., on the outer layers 20 of the first coil end 7 becomes more than +1 kV with the passage of time which lies in a range where most people will be unaware of electrical shocks.

Figure 9:
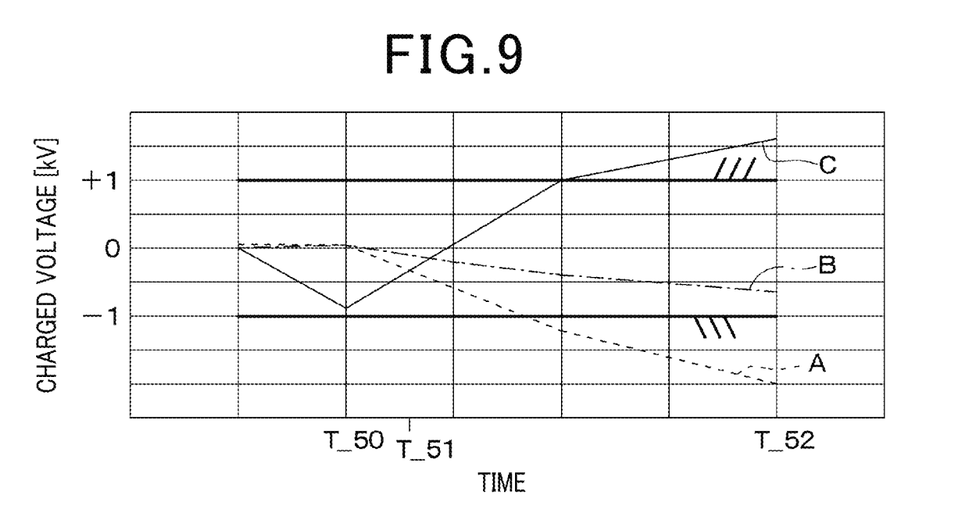
FIG. 9 is a graph which represents results of verification tests for neutralization of static electricity using a typical ionizer in a fourth comparative example.

FIG. 9 shows a change in level of voltage charged on the stator 1 when the outer layers 20 of the wire segments constituting the first coil end 7 are charged to a voltage level around −1 kv, after which the first coil end 7 is exposed to positive ions emitted from the ionizer, while the second coil end 8 is exposed to negative ions emitted from the ionizer. In FIG. 9, $T\_50$ denotes levels of voltage on the stator 1 after the stator 1 is charged. $T\_51$ to $T\_52$ denote levels of voltage charged on the stator 1 after static electricity on the stator 1 is neutralized. The broken line A shows that after the stator 1 is neutralized by the ionizer, the level of voltage, as measured by the first sensor 31, i.e., on the outer layers 20 of the second coil end 8 becomes more than −1 kV in terms of an absolute value with the passage of time, which lies in a range where most people will be unaware of electrical shocks. The solid line C shows that the level of voltage, as measured by the third sensor 33, i.e., on the outer layers 20 of the first coil end 7 becomes more than +1 kV with the passage of time, which lies in a range where most people will be unaware of electrical shocks.

The above verification tests show that it is impossible for the typical ionizer to neutralize static electricity on the stator 1 to a required degree.

Beneficial Advantages Offered by the First Embodiment

The static charge elimination method and the static charge eliminator in the first embodiment provide the following beneficial advantages as compared with the ionizer discussed in the above comparative example.

1) The static charge elimination method in the first embodiment includes a first step of placing the first contact 11 in electrical contact with the core 3 of the stator 1, a second step of placing the second contact 12 in electrical contact with the metallic section 21 of one of the wire segments of the coil 2 or the metallic section of one of the power wires 10, and a third step of placing the third contact 13 in electrical contact with the outer layers 20 of the wire segments constituting the first coil end 7. The first contact 11, the second contact 21, and the third contact 13 are, as described above, connected to ground. The first, second, and third steps are performed at the same time. The static charge elimination method serves to eliminate a risk of dielectric polarization of the outer layers of the wire segments of the coil 2 end and neutralize static electricity charged on the outer layers 20. This improves the productivity and the margin of safety of the stator 1.

2) The static charge eliminator in the first embodiment is, as described above, equipped with the first contact 11, the second contact 12, the third contact 13, and the drive unit 15. The first contact 11, the second contact 12, and the third contact 13 are each connected to ground. The first contact 11 is electrically contactable with the core 3 of the stator 1. The second contact 12 is electrically contactable with the metallic sections 21 of the wire segments of the coil 2 or the metallic sections 21 of the power wires 10. The third contact 13 is electrically contactable with the outer layers 20 of the wire segments of the first coil end 7. The drive unit 15 works to move at least one of the first contact 11, the second contact 12, the third contact 13, and the stator 1 to simultaneously achieve the electrical contacts between the core 3 and the first contact 11, between the metallic sections 21 of the wire segments of the coil 2 or the metallic sections 21 of the power wires 10 and the second contact 12, and between the outer layers 20 of the wire segments and the third contact 13. This structure enables the static charge eliminator to eliminate a risk of dielectric polarization of the outer layers 20 of the wire segments and achieves the neutralization of static electricity on the stator 1.

3) If a region which is defined to extend in a direction perpendicular to the axial direction of the core 3 and occupied by the outer layers 20 of the wire segments constituting the first coil end 7 is partly out of overlap with the plate 16 of the third contact 13 in the axial direction of the core 3, it results in a risk that electrical charges may escape to one or some of the outer layers 20 of the wire segments constituting the first coil end 7 which are out of overlap with the plate 16 of the third contact 13, thus leading to the dielectric polarization of the one or some of the outer layers 20. The static charge eliminator in the first embodiment is, however, designed to have the above region, as occupied by the outer layers 20 of the wire segments of the first coil end 7, which completely or entirely overlaps with the plate 16 of the third contact 13, thereby eliminating a risk of dielectric polarization of the outer layers 20 which may occur when the outer layers 20 of the wire segments of the first coil end 7 are placed in contact with the plate 16 of the third contact 13. This ensures the stability in neutralizing static electricity on the stator 1.

Second Embodiment

The second embodiment will be described below which is different in a portion of the stator 1 and a portion of the static charge eliminator from the first embodiment. The following discussion will refer only to such differences for the brevity of disclosure.

Figure 10:
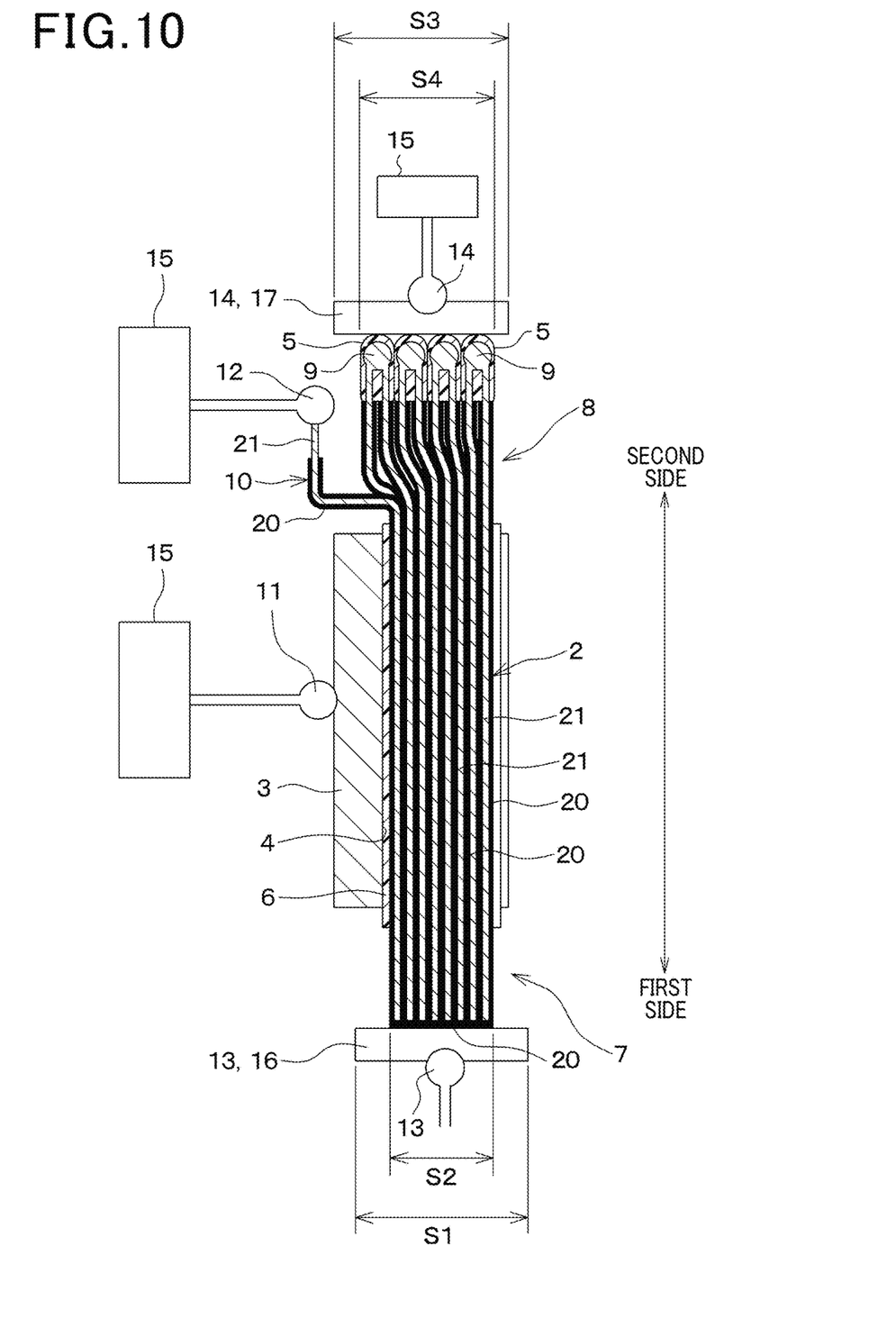
FIG. 10 is a side view which illustrates an armature and a static charge eliminator according to the second embodiment.

The stator 1 that is a target whose static electricity is neutralized by the static charge eliminator in the second embodiment, as illustrated in FIG. 10, has the welds 9 of the ends of the wire segments forming the second coil end 8 which are covered with the resin-molded members 5. The resin-molded members 5 may be provided one for each of the welds 9. Alternatively, some or all of the welds 9 may be molded with resin, in other words, wrapped by a single resin-molded member 5.

The static charge eliminator in the second embodiment includes the first contact 11, the second contact 12, the third contact 13, the fourth contact 14, and the drive unit 15.

The first contact 11, the second contact 12, and the third contact 13 are substantially identical in structure with those in the first embodiment, and explanation thereof in detail will be omitted here.

The fourth contact 14 is, like the first contact 11, the second contact 12, and the third contact 13, made from an electrically conductive material and connected to ground through a ground wire, not shown. The fourth contact 14 is arranged to be contactable with the resin-molded members 5 wrapping the ends of the wire segments of the second coil end 8. Specifically, the fourth contact 14 is equipped with the upper plate 17 of an annular or a disc-shape. The upper plate 17 is made from an electrically conductive material. The upper plate 17 has a major surface whose area S3 is selected to be equal to or larger than an area S4 that is an area of a region which is defined to extend in a direction perpendicular to the axial direction of the core 3 and occupied by the resin-molded members 5 wrapping the ends of the wire segments of the second coil end 8. The whole of the area S4 overlaps with the upper plate 17 of the fourth contact 14 (i.e., the area S3) as viewed in the axial direction of the core 3. This achieves a physical contact of the upper plate 17 of the fourth contact 14 with all of the resin-molded members 5 wrapping the wire segments of the second coil end 8, thereby enabling the fourth contact 14 to neutralize static electricity charged on the resin-molded members 5 wrapping the wire segments of the second coil end 8 without a risk of dielectric polarization of the resin-molded member 54. The fourth contact 14 is preferably designed to be contactable with all of the resin-molded members 5, but however, may alternatively be configured to be contactable with some of the resin-molded members 5 in view of a production error thereof.

The drive unit 15 works to move at least one of the first contact 11, the second contact 12, the third contact 13, the fourth contact 14, and the stator 1 to achieve physical and electrical contacts of the first contact 11, the second contact 12, the third contact 13, and the fourth contact 14 with selected portions of the stator 1. Specifically, the drive unit moves at least one of the first contact 11, the second contact 12, the third contact 13, and the fourth contact 14 to simultaneously establish contacts between the core 3 and the first contact 11, between the metallic section 21 of the power wire 10 and the second contact 12, between the outer layers 20 of the wire segments and the third contact 13, and between the resin-molded members 5 and the fourth contact 14.

In the example illustrated in FIG. 10, the drive unit 15 works to move the first contact 11, the second contact 12, and the fourth contact 14. Specifically, the stator 1 is disposed on the plate 16 of the third contact 13 with the outer layers 20 of the wire segments of the first coil end 7 being in contact with the plate 16 of the third contact 13. The drive unit 15 then move the first contact 11, the second contact 12, and the fourth contact 14 to simultaneously make a physical contact of the first contact 11 with the core 3, a physical contact of the second contact 12 with the metallic section 21 of the power wire 10 or the wire segment of the coil 2, and a physical contact of the fourth contact 14 with the resin-molded members 5, so that times when such contacts are established coincide with each other. This neutralizes static electricity charged on portions of the stator 1 without a risk that the static electricity may escape to other portions of the stator 1.

The second embodiment, as described above, establishes the contact of the outer layers 20 of the wire segments of the coil 3 with the third contact 13 and the contact of the resin-molded members 5 with the fourth contact 14, thereby enabling the size or dimension of the stator 1 in the axial direction thereof to be measured as well as the neutralization of static electricity charged on the stator 1. In other words, the static charge eliminator may be designed as a device capable of removing the static electricity from the stator 1 and measuring the axial dimension of the stator 1. The static charge eliminator and the static charge elimination method in the second embodiment offers the following beneficial advantages.

1) The static charge elimination method in the second embodiment includes a first step of placing the first contact 11 in electrical contact with the core 3 of the stator 1, a second step of placing the second contact 12 in electrical contact with the metallic section 21 of a selected one of the wire segments of the coil 2 or the metallic section 21 of a selected one of the power wires 10, a third step of placing the third contact 13 in electrical contact with the outer layers 20 of the wire segments constituting the first coil end 7, and a fourth step of placing the fourth contact 14 in electrical contact with the resin-molded members 5 wrapping the second coil end 8. The first contact 11, the second contact 21, the third contact 13, and the fourth contact 14 are, as described above, connected to ground. The first, second, third, and fourth steps are performed at the same time. The static charge elimination method serves to eliminate a risk of dielectric polarization of the outer layers 20 of the wire segments of the coil 2 end and the resin-molded members 5 and also neutralize static electricity charged on the stator 1. This improves the productivity and the margin of safety of the stator 1.

2) The static charge elimination method in the second embodiment includes achieving contact of the third contact 13 with the outer layers of the wire segments of the first coil end 7 and contact of the fourth contact 14 with the resin-molded members 5 wrapping the ends of the wire segments of the second coil end 8 which is opposed to the first coil end 7 in the axial direction of the stator 1, thereby enabling the neutralization of static electricity on the stator 1 and measurement of an axial dimension of the stator 1. The neutralization of static electricity on the stator 1 and the measurement of the axial dimension of the stator 1 are performed simultaneously, thereby facilitating the production steps of the stator 1, shortening a production time for the stator 1, and improving the productivity of the stator 1.

3) The static charge eliminator in the second embodiment is, as described above, equipped with the first contact 11, the second contact 12, the third contact 13, the fourth contact 14, and the drive unit 15. The first contact 11, the second contact 12, and the third contact 13, and the fourth contact 14 are each connected to ground. The first contact 11 is electrically contactable with the core 3 of the stator 1. The second contact 12 is electrically contactable with the metallic section 21 of one of the wire segments of the coil 2 or the metallic section 21 of one of the power wires 10. The third contact 13 is electrically contactable with the outer layers 20 of the wire segments of the first coil end 7. The fourth contact 14 is electrically contactable with the resin-molded members 5 wrapping the second coil end 8 which is opposed to the first coil end 7 in the axial direction of the stator 1. The drive unit 15 works to move at least one of the first contact 11, the second contact 12, the third contact 13, the fourth contact 14, and the stator 1 to simultaneously achieve the electrical contacts between the core 3 and the first contact 11, between the metallic sections 21 of the power wires 10 and the second contact 12, between the outer layers 20 of the wire segments and the third contact 13, and between the resin-molded members 5 and the fourth contact 14. This structure enables the static charge eliminator to eliminate a risk of dielectric polarization of the outer layers 20 and the resin-molded members 5 and achieves the neutralization of static electricity on the stator 1.

4) If a region which is defined to extend in a direction perpendicular to the axial direction of the core 3 and occupied by the resin-molded member 5 wrapping the wire segments of the second coil end 8 is partly out of overlap with the plate 17 of the fourth contact 14 in the axial direction of the core 3, it results in a risk that electrical charges may escape to one or some of the resin-molded members 5 covering the wire segments of the second coil end 8 which are out of overlap with the plate 17 of the fourth contact 14, thus leading to the dielectric polarization of the one or some of the resin-molded members 5. The static charge eliminator in the second embodiment is, however, designed to have the above region, as occupied by the resin-molded members 5 covering the wire segments constituting the second coil end 8, which entirely overlaps with the plate 17 of the fourth contact 14, thereby eliminating a risk of dielectric polarization of the resin-molded members 5 which may occur upon contact of the resin-molded members 5 with the upper plate 17 of the fourth contact 14, which ensures the stability in neutralizing static electricity on the stator 1.

Other Embodiments

Each of the embodiments has referred to the stator 1 designed as an armature that is a target whose static electricity is to be neutralized, but however, the armature may be implemented by a rotor equipped with the coil 2.

Each of the embodiments has referred to the Y-connected coil 2 of the stator 1 that is a target whose static electricity is to be neutralized, but however, the coil 2 may alternatively be designed in the form of Δ-connection, ΔY-connection, YΔ-connection, AΔ-connection, or YY connection.

While the preferred embodiments have been disclosed in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or clearly essential in principle.

What is claimed is:

1. A static charge elimination method for neutralizing static electricity on an armature of a rotating electrical machine comprising:
   a first step of placing a first contact in contact with a core of the armature, the first contact being connected to ground;
   a second step of placing a second contact in contact with a metallic section of one of wire segments constituting a coil of the armature or a metallic section of one of power wires electrically connecting with the coil, the second contact being connected to ground; and
   a third step of placing a third contact in contact with at least one of outer layers of portions of the wire segments constituting a first coil end protruding from slots formed in the core outside a first end that is one of axially opposed ends of the core, the third contact being connected to ground, wherein
   the first step, the second step, and the third step are performed simultaneously.

2. The static charge elimination method as set forth in claim 1, wherein the armature is implemented by one of a stator and a rotor of the rotating electrical machine.

3. A static charge elimination method for neutralizing static electricity on an armature of a rotating electrical machine comprising:
   a first step of placing a first contact in contact with a core of the armature, the first contact being connected to ground;
   a second step of placing a second contact in contact with a metallic section of one of power wires electrically connecting with the coil, the second contact being connected to ground;
   a third step of placing a third contact in contact with outer layers of portions of the wire segments constituting a first coil end protruding from slots formed in the core outside a first end that is one of axially opposed ends of the core, the third contact being connected to ground; and
   a fourth step of placing a fourth contact in contact with a resin-molded member wrapping the wire segments constituting a second coil end protruding from slots formed in the core outside a second end of the core axially opposed to the first end of the core, the fourth contact being connected to ground, wherein
   the first step, the second step, the third step, and the fourth step are performed simultaneously.

4. The static charge elimination method as set forth in claim 3, further comprising measuring an axial dimension of the armature by means of the third step of placing the third contact in contact with the outer layer of the portions of the wire segments constituting the first coil end protruding outside the first end and the fourth step of placing the fourth contact in contact with the resin-molded member wrapping the wire segments constituting the second coil end protruding outside the second end of the core.

5. The static charge elimination method as set forth in claim 3, wherein the armature is implemented by one of a stator and a rotor of the rotating electrical machine.

6. A static charge eliminator for neutralizing static electricity on an armature of a rotating electrical machine comprising:
   a first contact which is contactable with a core of the armature and connected to ground;
   a second contact which is contactable with a metallic section of one of wire segments constituting a coil of the armature or a metallic section of one of power wires electrically connecting with the coil, the second contact being connected to ground;
   a third contact which is contactable with at least one of outer layers of portions of the wire segments constituting a first coil end protruding from slots formed in the core outside a first end that is one of axially opposed ends of the core, the third contact being connected to ground; and
   a drive unit which works to move at least one of the first contact, the second contact, the third contact, and the armature to simultaneously achieve contacts between the core and the first contact, between the metallic section of one of the wire segments or the metallic section of one of the power wires and the second contact, and between the outer layer of the portions of the wire segments and the third contact.

7. The static charge eliminator as set forth in claim 6, wherein the third contact includes a plate which is configured to overlap with a whole of a region, as viewed in an axial direction of the core, where the outer layer of the wire segments of the first coil end is arranged.

8. The static charge eliminator as set forth in claim 6, wherein the armature is implemented by a stator and a rotor of the rotating electrical machine.

9. A static charge eliminator for neutralizing static electricity on an armature of a rotating electrical machine comprising:
   a first contact which is contactable with a core of the armature and connected to ground;
   a second contact which is contactable with a metallic section of one of power wires electrically connecting with the coil, the second contact being connected to ground;
   a third contact which is contactable with at least one of outer layers of portions of the wire segments constituting a first coil end protruding from slots formed in the core outside a first end that is one of axially opposed ends of the core, the third contact being connected to ground;
   a fourth contact which is contactable with a resin-molded member wrapping the wire segments constituting a second coil end protruding from slots formed in the core outside a second end of the core axially opposed to the first end of the core, the fourth contact being connected to ground; and a drive unit which works to move at least one of the first contact, the second contact, the third contact, the fourth contact, and the armature to simultaneously achieve contacts between the core and the first contact, between the metallic section of one of the power wires and the second contact, between the outer layers of the portions of the wire segments and the third contact, and between the resin-molded member and the fourth contact.

10. The static charge eliminator as set forth in claim 9, wherein the third contact includes a plate which is configured to overlap with a whole of a region, as viewed in an axial direction of the core, where the outer layers of the wire segments of the first coil end are arranged.

11. The static charge eliminator as set forth in claim 10, wherein the fourth contact includes a plate which is configured to overlap with a whole of a region, as viewed in an axial direction of the core, where the resin-molded layer of the wire segments of the first coil end is arranged.

12. The static charge eliminator as set forth in claim 9, wherein the armature is implemented by a stator and a rotor of the rotating electrical machine.

* * * * *